United States Patent
Hubble et al.

[15] 3,667,430
[45] June 6, 1972

[54] MODULAR COMBINED MOISTURE SEPARATOR AND REHEATER

[72] Inventors: William Schenck Hubble; Kenneth K. Woods, both of Cape Elizabeth, Maine; Salvatore S. Tramuta, Schenectady, N.Y.

[73] Assignee: General Electric Company

[22] Filed: June 4, 1970

[21] Appl. No.: 43,359

[52] U.S. Cl............................................................122/483
[51] Int. Cl..............................................................F22g 5/16
[58] Field of Search..............................122/34, 483; 55/349

[56] References Cited

UNITED STATES PATENTS 3,472,209  10/1969  Roffler...............................122/483 X
3,500,796   3/1970  Roffler...............................122/483 X
3,508,527   4/1970  Durrer...................................122/483

*Primary Examiner*—Kenneth W. Sprague
*Attorney*—William C. Crutcher, Bryan C. Ogden, Frank L. Neuhauser, Oscar B. Waddell and Joseph B. Forman

[57] ABSTRACT

A combined moisture separator and reheater suitable for a nuclear steam turbine-generator powerplant has modular reheater stages in which the tubes extend in a transverse direction to the shell centerline and a pair of moisture separator elements which are positioned in parallel along either side of the shell. The steam to be reheated enters the shell through a plurality of openings towards the bottom of the shell and flows generally in a vertical direction up through the moisture separator elements and over the rows of reheater tubes and then out of the shell through a plurality of openings toward the top thereof. A uniform flow is maintained by the appropriate arrangement of the reheater stages and the moisture separator elements. By standardizing the cross section of the combined moisture separator and reheater, the overall capacity may be readily increased by simply adding any desired number of additional axial sections of moisture separator elements and reheater stages.

7 Claims, 5 Drawing Figures

INVENTORS:
WILLIAM S. HUBBLE,
KENNETH K. WOODS,
SALVATORE S. TRAMUTA,

BY Bryan C. Ogden
THEIR ATTORNEY.

INVENTORS:
WILLIAM S. HUBBLE
KENNETH K. WOODS,
SALVATORE S. TRAMUTA,

BY Bryan C. Ogden
THEIR ATTORNEY.

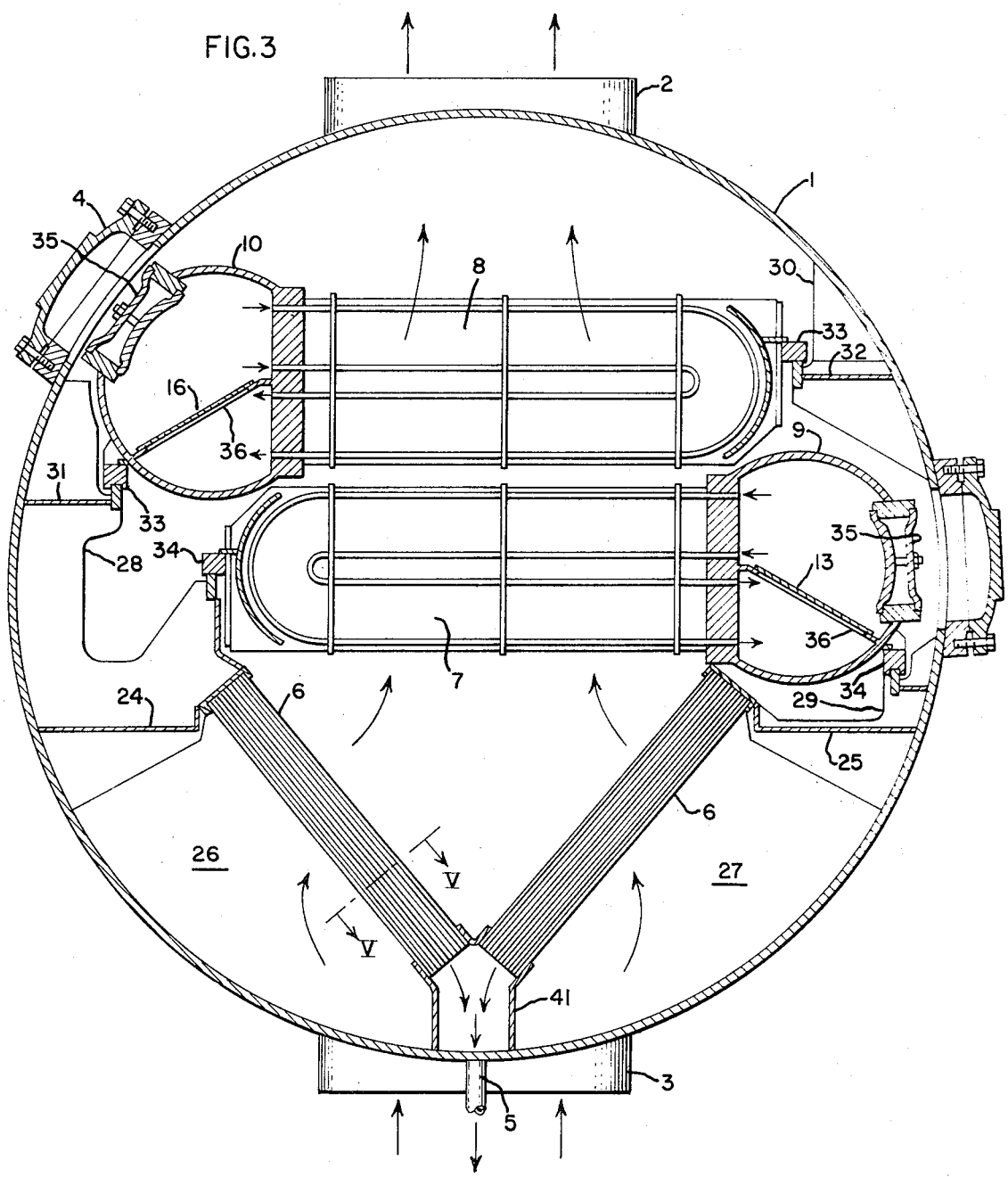

MODULAR COMBINED MOISTURE SEPARATOR AND REHEATER

BACKGROUND OF THE INVENTION

This invention relates generally to an apparatus for separating moisture from wet steam and then reheating the steam for use in steam power stations. More particularly, it relates to a modular reheater which contains the moisture separator integral therewith.

In large steam power stations, where a series of turbines are employed, it is often desirable to reheat the steam before it passes to a succeeding turbine stage. In certain applications, it is also desirable to separate the moisture from the steam which has just exhausted from the high pressure turbine before being reheated, and this is particularly prevalent in the design of turbines for use with some types of nuclear boilers where relatively low pressure steam is generated.

Reheaters and moisture separators are well known in the art and there have been several suggestions for combining the moisture separator elements with the reheater into a single shell. Two examples of such combined moisture separator and reheaters may be seen by referring to U.S. Pat. No. 3,472,209 issued to Josua Roffler on Oct. 14, 1969 and co-pending application Ser. No. 776,365 filed in the names of E.H. Miller and S. Chesmejef on Nov. 18, 1968 and assigned to the assignee of the present invention. Both of these examples show the combined feature of the moisture separator and reheater but both have the reheater tube bundles extending longitudinally or axially within the shell. The problem associated with this construction philosophy is that should it become desirable to replace the reheater tubes for one reason or another, an entire axial tube or tubes would have to be removed. Thus, it would be advantageous to provide reheater tubes within the shell which could be easily removed and replaced should conditions so warrant.

Another problem in the prior art was the limitation of the capacity of the combined moisture separator and reheater. As the longitudinally extending reheater tubes were increased in axial length, the ability to handle and manufacture these long tubes became difficult, requiring significantly increased manufacturing space and facility. If it was desired to increase the reheating capacity in a steam turbine power station, it was necessary to add another complete moisture separator and reheater with its attendant bulky shell dimensions thereby taking up valuable powerplant space. It would be desirable to provide a modular design for the combined moisture separator and reheater, whereby to increase the capacity, it would be merely a matter of adding another standardized module to the existing shell. It has been found that by this method, two prior art combined moisture separator and reheaters can be condensed into a single shell with only slightly larger physical dimensions. Of course, with twin shells, each of standardized modular design, the manufacturing costs are appreciably reduced as are the installation costs in the field. When manufacturing the combined moisture separator and reheaters with the longitudinally extending reheater tubes, the procedure was cumbersome and difficult, directly increasing the cost. Using shorter tubes with a standardized cross section as does the present invention, results in a design which is easier to make and assemble.

Accordingly, one object of the present invention is to provide standardized modules which can be joined together in order to form the total combined moisture separator and reheater.

Another object of the present invention is to provide a construction in which reheater tubes for a combined moisture separator and reheater may easily be removed and replaced.

Yet another object is to provide a moisture separator and reheater which is lower in cost to manufacture and install.

Still a further object of this invention is to allow the use of shorter reheater tubes which will be more reliable during operation.

SUMMARY OF THE INVENTION

Briefly stated, the present invention is practiced in one form by providing a combined, moisture separator and reheater with a plurality of relatively short reheater tubes positioned toward the top of the single shell and running in a transverse direction to the shell centerline. Two stages of reheater tube bundles may be provided, each comprised of "U" tubes together with a reheating steam header. A pair of inertial moisture separators are disposed in the shell toward the bottom thereof and along either side.

BRIEF DESCRIPTION OF THE DRAWING

FIG. 3 is a transverse cross section taken through the combined moisture separator and reheater shell along lines III—III of FIG. 1.

FIG. 4 is a cutaway perspective showing the closed end of the unit.

DESCRIPTION OF THE PREFERRED EMBODIMENT

Figure 1:
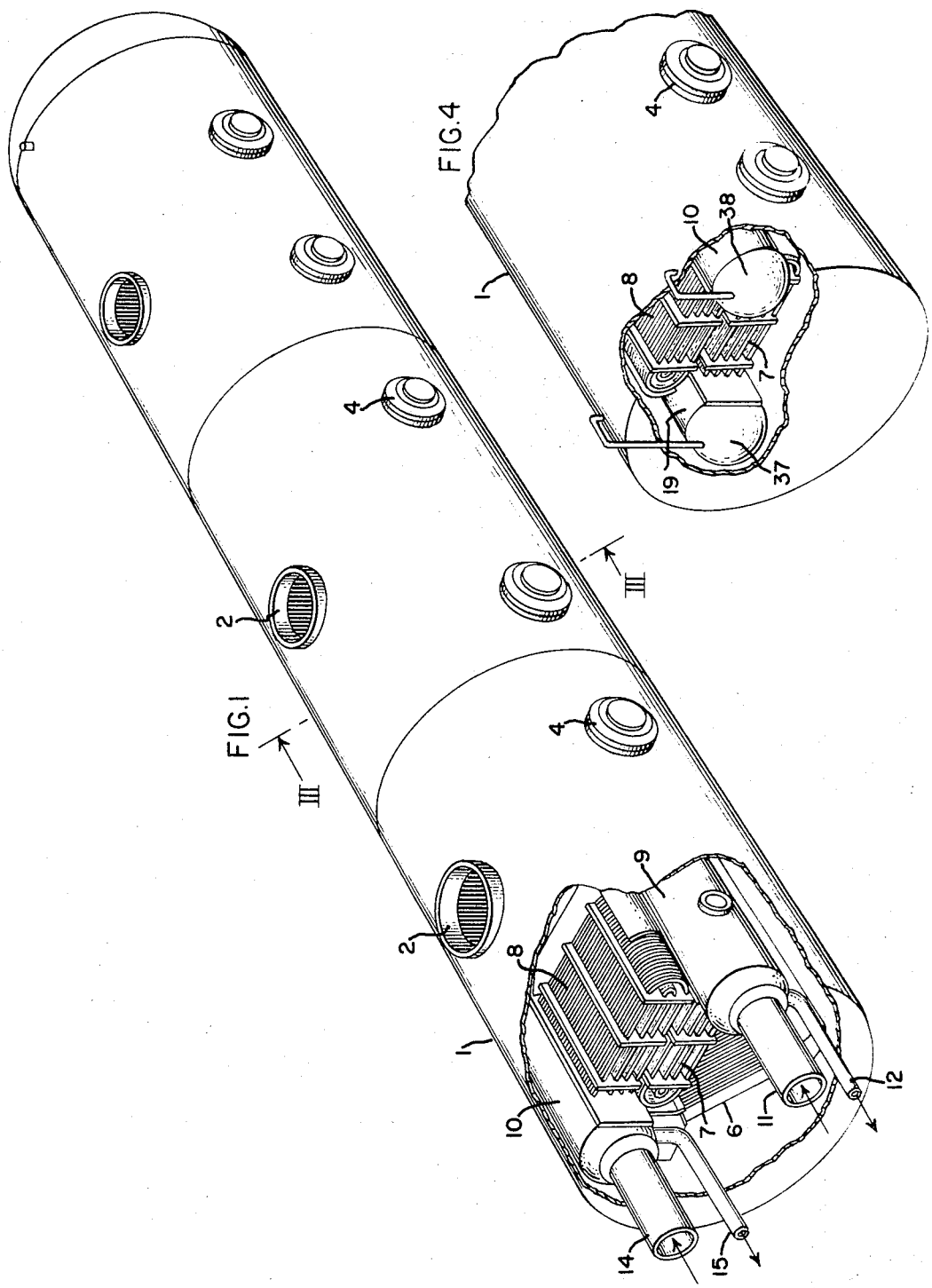
FIG. 1 is a perspective view partly in section of the combined moisture separator and two stage reheater.

Referring to FIG. 1 of the drawing, the combined moisture separator and reheater is housed in a single shell generally indicated as 1 and having a plurality of outlet openings 2 positioned along the top thereof. A plurality of steam inlet holes are indicated as 3 (not shown in FIG. 1 but shown on FIGS. 2 and 3) and are positioned generally towards the bottom of the shell 1. Positioned along the side of shell 1 are a plurality of manholes 4 which are sized so that a man will be able to enter the shell 1, either during construction or once constructed, if it is necessary to repair any of the internal elements. Also positioned along the bottom of the shell 1 are a plurality of drain pipes 5, whereby the moisture which is separated from the wet steam may be directed from the shell 1 (shown on FIGS. 2 and 3).

Inside the shell 1 are banks of inclined moisture separator elements 6 of a low pressure drop, inertia separator type, sometimes known as wiggle plate or zigzag separators. The separator elements 6 extend generally the entire length of shell 1 and are sectioned at specific positions in order to form lengths corresponding to modular sections. This will be more fully described later. The two stage reheater internal to the shell 1 is located generally in the upper volume of shell 1 and is comprised of finned tube reheating stages 7 and 8. Each stage is of the two pass type and the direction of the finned tubes extend generally transverse to the center line of the shell 1. Each reheater stage 7, 8 has a separate longitudinally extending header internal to shell 1 with the first stage reheater header indicated at 9 and the second stage reheater header indicated as 10. Extraction steam from the high-pressure turbine enters the first stage header 9 through inlet 11 and leaves through outlet 12 to provide the first stage reheating. By referring to FIG. 3, the flow separation plate 13 will be seen which extends axially the length of the first stage reheater header 9 and is provided in order to direct the flow of the extraction steam into the finned "U" tubes, and to properly separate the exiting condensate as it exits so that it may be directed to the outlet 12.

In a like manner the second stage reheater header 10 is provided with an inlet 14 for the entry therethrough of high pressure throttle steam which then makes the pass through the second reheating stage 8 and out through the header outlet 15. Also in a like manner as seen in FIG. 3, a second stage flow separation plate 16 extends axially the length of the second stage header 10 in order to separate the inlet steam flow from the exit condensate.

It was previously mentioned that the moisture separator elements 6 could be sectioned at any convenient axial position depending upon the method of construction and desired capacity. In a like manner, it will be appreciated that the first and second reheater stages 7, 8 can be sectioned at any convenient axial position transverse to the centerline of the shell 1 for manufacturing or repair purposes. In this manner, the reheater stages with headers can be constructed in the factory of a relatively short axial length and then shipped to the field erection site where a plurality of such reheater stage sections are joined together axially within the shell 1 to form the overall combined moisture separator and reheater. Also, by utilizing modular reheater stages and sectioned moisture separator elements the overall capacity of the combined moisture separator and reheater can be varied depending upon the desired capacity by simply extending the axial length of the moisture separator and reheater by the addition of more moisture separator elements and axially extending modular reheater stages enclosed within an additional shell section.

Further, by providing the reheater stages 7, 8 with such a configuration, it will be appreciated that on assembly, it will be a simple matter to slide the individual stages axially down the shell 1 into their proper positions.

Figure 2:
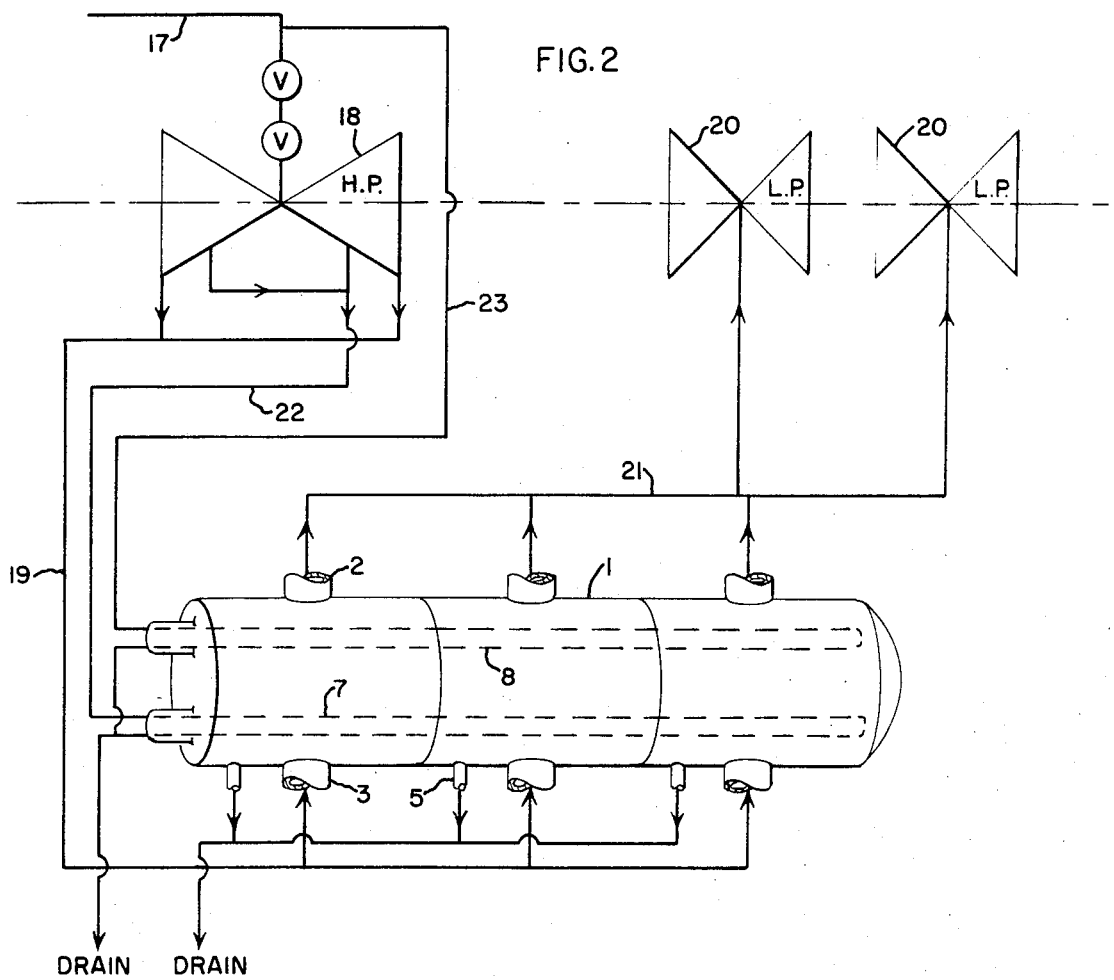
FIG. 2 is a simplified and partial schematic view of the steam turbine cycle showing the location of the combined moisture separator and reheater.

Reference to FIG. 2 of the drawing illustrates the general environment of the present invention. Steam from a source such as a nuclear reactor on the order of 900 psi absolute and 550° F is introduced from inlet line 17 to the high pressure turbine 18 and, after expansion, flows to the plurality of inlet holes 3 through line 19. The dry and reheated steam leaves the plurality of outlet holes 2 and flows to the low pressure turbines 20 through line 21. The tubes of the first stage reheater 7 as previously mentioned are supplied with steam extracted from the high pressure turbine 18 via line 22. The tubes of the second stage reheater 8 are supplied with higher temperature throttle steam via line 23.

Referring now more specifically to FIG. 3 which is a cross section through the combined moisture separator and reheater, the inclined separator elements 6 are shown as extending upwardly from the bottom of shell 1. Extending from the shell 1 to the end of each moisture separator element 6 are longitudinal baffle plates 24, 25 which in cooperation with the moisture separator elements define a pair of longitudinal steam supply manifolds 26, 27 along the length of the shell 1. As the steam to be reheated enters the shell 1 through the plurality of inlet holes 3, it will be distributed evenly between the supply manifolds 26, 27 such that it will tend to flow across the separator elements 6 in a uniform manner.

A plurality of vertically extending stiffeners 28, 29 and 30 are axially spaced along the inside of shell 1 in order to provide a support for the moisture separator elements 6 and the reheater stages 7 and 8. Extending axially between the vertical stiffeners 28 and 30 are a plurality of second stage baffle plates 31, 32 which serve to prevent the steam that is being reheated from deviating from its desired path. The baffle plates 31, 32 also provide the base for the mounting structure of the second stage reheater 8. On each side of the second reheater stage 8 is a mounting member 33 which is fashioned so that the longitudinally extending reheater stage 8 will readily slide into and out of the shell 1 for maintenance purposes. In a like manner, the first stage reheater 7 has a mounting member 34 on each side whereby the reheater stage is readily slidable in the longitudinal direction to its mounting position.

As previously mentioned, a plurality of manholes 4 are provided in the shell 1 for ready access to the interior should the occasion warrant. In a like manner, each manhole 4 has opposed to it in the reheater headers 9, 10 a removable manway 35 for easy entry into the headers should the conditions warrant, for example for an inspection of the reheater tubes. Also, in a like manner, the flow separation plates 13, 16 have a plurality of manways 36 located along their axial length for entry into the bottom portions of the headers 9, 10.

In FIG. 4, details of the opposite end of the combined moisture separator and reheater from that of FIG. 1 (and viewed from the opposite direction) are shown by the cutaway portion of shell 1. The reheater stages 7, 8 of course extend to the opposite end and the reheater headers 9, 10 terminate with hemispherical heads 37, 38 respectively. Hemispherical heads are utilized since the pressure of the heating steam is on the order of 1,000 psi as it enters the headers and makes its pass through the tubes.

Figure 5:
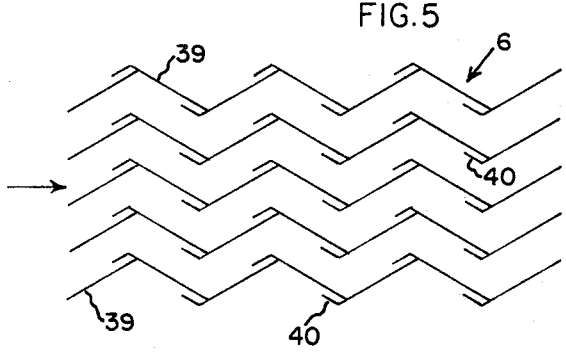
FIG. 5 is a cross sectional view through typical separator elements taken along lines V—V of FIG. 3.

FIG. 5 shows a view through a typical moisture separator of a known type, wherein it is seen that the separator elements 6 consist of zigzag plate members 39 having moisture collection flanges 40. Steam flowing through the passages between the plates 39 undergoes change of direction which causes droplets to impinge on the plates and be caught by the flanges 40 and drained downward as indicated by arrows in FIG. 3 of the drawing. The moisture is collected at the bottom of shell 1 within the moisture separator mounting channel 41 where it is directed to the plurality of drain pipes 5.

OPERATION OF THE INVENTION

The operation of the invention is best understood by reference to FIG. 3. As the steam to be reheated enters the inlet holes 2, it will enter the steam supply manifolds 26, 27 where it is evenly distributed to pass through the moisture separator elements 6. As previously mentioned, upon passing through the separator elements, the moisture is separated out and drained from the shell. The dry steam then continues (indicated by arrows) in a generally vertical direction up and through the reheater stages 7, 8 passing over their respective heat exchange tubes where heat of the reheating steam is transferred to the steam to be reheated. The various baffle plates maintain the steam to be reheated in its proper flow path. After the dry reheated steam exists from the shell 1 through the outlet holes 2, it is directed to the low pressure turbines 20 where it is expanded to produce useful work.

The orientation of the moisture separator elements on opposite sides of the centerline of the shell and the vertically stacked disposition of the reheater stages, one stage above the other, provides a very compact design. The reheater tubes are spaced and arranged to cause a relatively high pressure drop and high flow velocity through the reheater portion relative to the moisture separator portion, although the overall pressure drop through the combined moisture separator and reheater is rather small. By appropriate selection of the number of tube rows and tube spacing in the reheater stages, the flow area is chosen so that it is much smaller, relatively speaking, than through that of the moisture separator elements. Consequently, the flow velocity will be higher through the reheater stages than through the separator elements, preferably on the order of a 4:1 ratio. Since the pressure drops are roughly related to the square of the velocity, this means that the pressure drop through the moisture separator is negligible relative to that in the reheater stages. The effect of a downstream resistance forcing uniform distribution through a number of upstream passages is understood in the art, and acts to cause uniform distribution among separator elements in the present design.

It will be appreciated that the cross section of the overall combined moisture separator and reheater is standardized and as such, the modular concept may be utilized when additional capacity is desired. The manholes and manways provide access to the interior of the shell when such an addition is made. Thus, there has been described an improved configuration for a combined moisture separator and reheater, whereby the tube bundles extend in a transverse direction to the shell centerline. It will be further appreciated that since the transverse tubes are of a relatively short length, their reliability is increased because relative thermal expansion is considerably reduced.

It may occur to others of ordinary skill in the art to make modifications of this invention which will remain within the concept and scope thereof and will not constitute a departure therefrom. Accordingly, it is intended that the invention be not limited by the details in which it has been described but that it encompass all within the purview of the following claims.

What is claimed is:

1. A combined moisture separator and reheater of the type having a substantially cylindrical pressure-tight shell comprising:
   a plurality of substantially horizontal heat exchange tubes disposed within the shell and toward the top thereof and extending in a direction generally transverse to the shell centerline,
   at least one longitudinally extending header disposed within the shell and communicating with the tubes,
   a means supplying a heating fluid to the header and tubes,
   a moisture separator disposed within the shell toward the bottom thereof and having elements arranged to define, together with portions of the shell, a longitudinally extending manifold supplying the elements, and
   said pressure-tight shell defining opposed inlet and outlet openings, said inlet opening connected to supply the manifold with steam and said outlet opening connected to remove the steam after it has passed over the heat exchange tubes.

2. A moisture separator and reheater according to claim 1 further including a plurality of longitudinally extending plate members arranged to guide steam from the manifold through the moisture separator and over the heat exchange tubes to the outlet opening.

3. A moisture separator and reheater according to claim 1 further including a plurality of removable manways positioned in the shell and header opposite one another so that entry can be made to the inside of the header.

4. A moisture separator and reheater according to claim 1, further including drain means communicating with the moisture separator and adapted to remove excess liquid separated from the steam from the shell.

5. A moisture separator and reheater according to claim 1 wherein the header is a pressure-tight vessel and is partitioned internally such that the heating fluid is directed into the tubes and returns to the header where it is removed from the shell.

6. A combined moisture separator and reheater of the type having a substantially cylindrical pressure-tight shell comprising at least two substantially cylindrical sections, each of said sections comprising:
   outer wall portions adapted for connecting together end-to-end,
   a plurality of heat exchange tubes disposed within said sections toward the tops thereof and extending in a direction generally transverse to the shell centerline,
   at least one longitudinally extending header section disposed within said shell sections and communicating with said tubes and having a transverse cross-section adapted for pressure-tight joining end-to-end with a header section disposed within an adjacent shell section,
   means supplying a heating fluid to said header and tubes,
   a moisture separator disposed in at least one of the shell sections toward the bottom thereof and having elements arranged to define, together with portions of the shell section, a longitudinally extending manifold supplying said elements, and
   said pressure-tight shell defining opposed inlet and outlet openings, said inlet openings connected to supply said manifold with steam and said outlet openings connected to remove said steam after it has passed over the heat exchange tubes.

7. A moisture separator and reheater according to claim 6 further including a plurality of longitudinally extending plate members adapted for joining end-to-end to those in an adjacent shell section and arranged to guide steam from the manifold through the moisture separator and over the heat exchange tubes to the outlet opening.

* * * * *